United States Patent [19]
Neugebauer

[11] 3,826,036
[45] July 30, 1974

[54] INSECTICIDAL DEVICE

[75] Inventor: Guenther Neugebauer, Haan, Germany

[73] Assignee: American Home Products Corporation, New York, N.Y.

[22] Filed: Apr. 17, 1973

[21] Appl. No.: 351,898

[52] U.S. Cl.............. 43/131, 43/132 R, 206/45.14
[51] Int. Cl............................................. A01m 1/20
[58] Field of Search.......... 43/131, 132 R, 116, 117, 43/120, 124, 125; 239/55, 56; 206/45.14; 220/60 R

[56] References Cited
UNITED STATES PATENTS

| | | | |
|---|---|---|---|
| 2,157,449 | 5/1939 | Berg | 43/131 |
| 3,554,367 | 1/1971 | Hoover | 206/45.14 |
| 3,596,822 | 8/1971 | Holley | 229/15 |
| 3,643,371 | 2/1972 | Gordon | 43/131 |
| 3,659,373 | 5/1972 | Daeninckx | 43/125 |

FOREIGN PATENTS OR APPLICATIONS 1,526,990  4/1968  France................................ 43/131

Primary Examiner—James H. Czerwonky
Attorney, Agent, or Firm—Vito Victor Bellino; Joseph Martin Weigman

[57] ABSTRACT

An insecticidal device is described which is made up of an insecticidal composition coated on to a substrate which is supported in a cage that may be either suspended or mounted on a horizontal surface. The insecticidal composition is made up of an insect attractant and a non-volatile, contact poison or stomach poison. The one-piece, hinged device has interconnected planar members with large openings, and edge stiffener strips defining side openings. Means are mounted on each stiffener strip to join the interconnected members in abutting relation to support the substrate therebetween.

6 Claims, 11 Drawing Figures

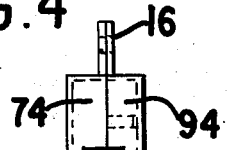
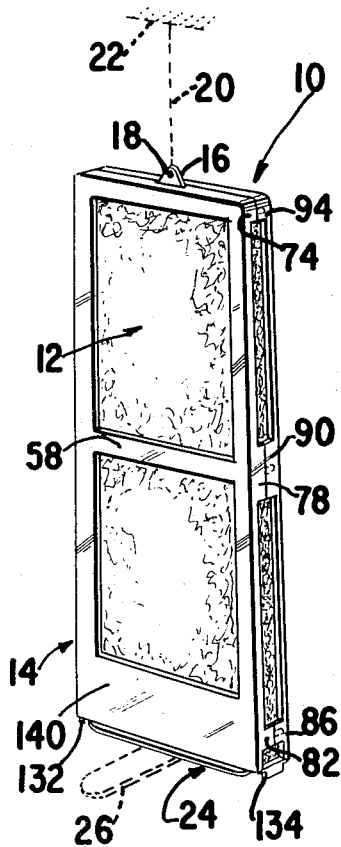
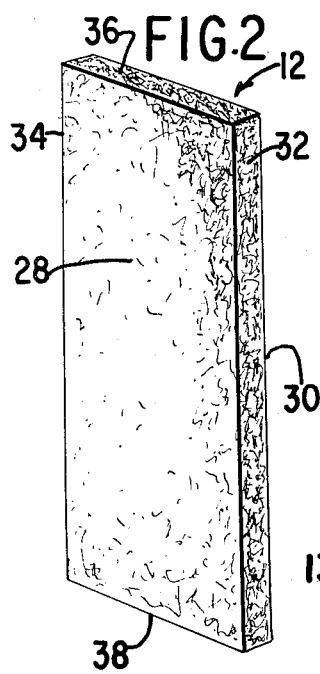
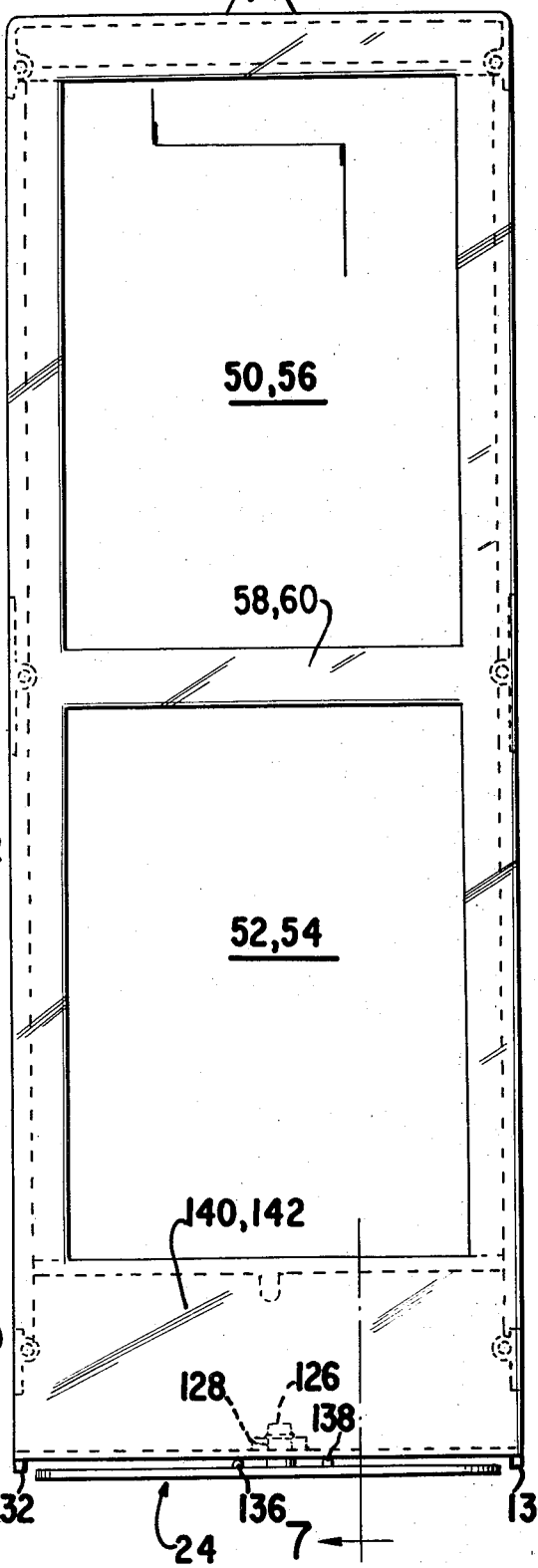
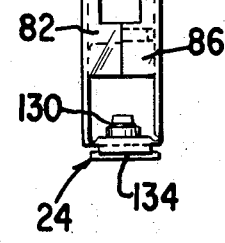

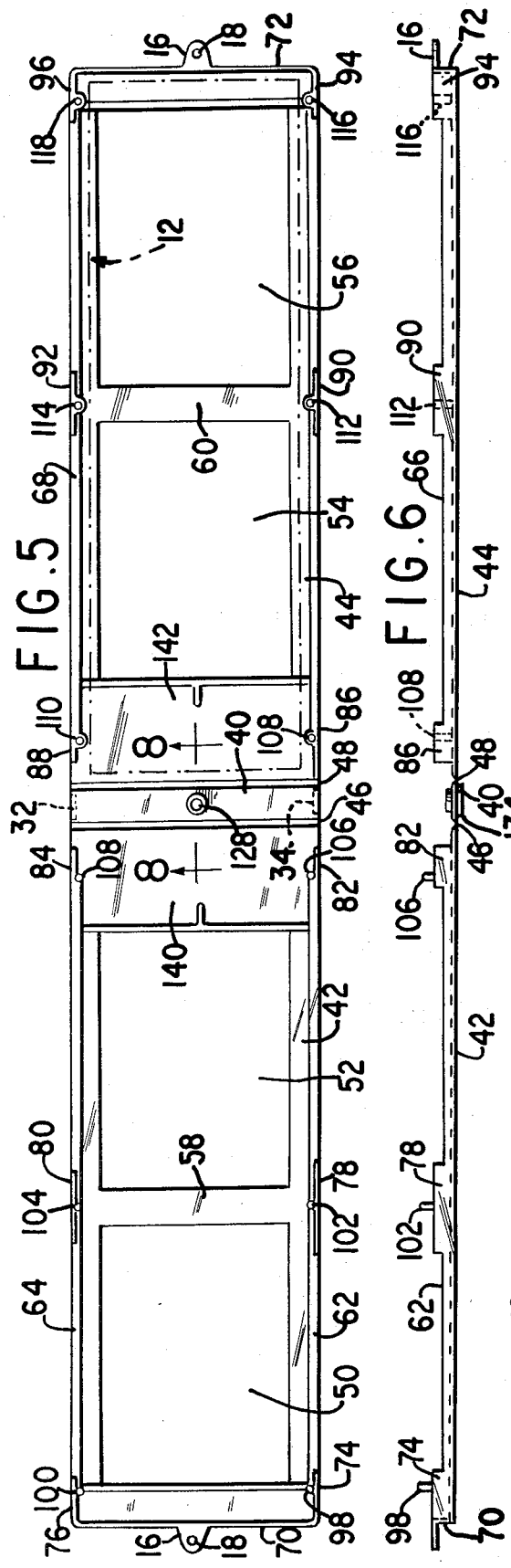
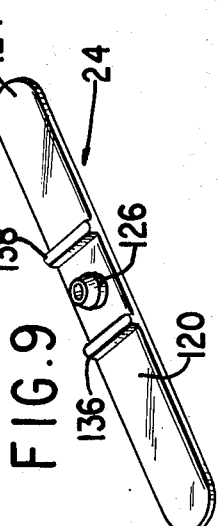
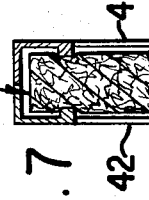
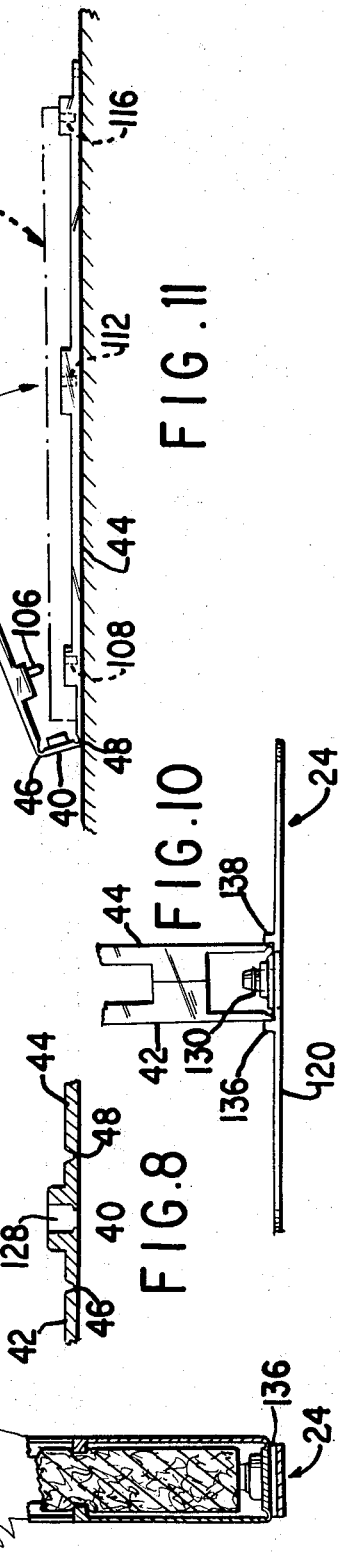

INSECTICIDAL DEVICE

The present invention is directed to an insecticidal device. More particularly the invention is directed to a support device for an insecticidal composition. The insecticidal device consists of a substrate for an insecticidal composition in which the substrate is supported in a cage so that it may be handled without contacting, or touching, the insecticidal composition which is coated onto the surface of the substrate. The cage also provides means by which the insecticidal device may be suspended from a support member or, alternatively, may be made to stand on a horizontal surface. The insecticidal composition consists of an insect attractant and a non-volatile insecticide which may be either a contact poison or a stomach poison.

The room insecticidal devices known in the prior art such as those described in U.S. Pat. Nos. 3,318,769 and 3,605,321 make use of 2,2-dichlorovinyl dimethyl phosphate (DDVP) which is dispersed in a substrate so that the DDVP which is relatively volatile migrates to the surface of the substrate and evaporates into the atmosphere. While such devices are effective insecticides they do create a pollution of the air in the room in which they are contained. While the long range effect of breathing such fumes is not known, in the present day emphasis on purity of environment it is undesirable to have pollutant chemicals disposed in the breathable air on a continuing basis.

It is an object of the present invention to provide an insecticidal device which is effective and attractive in appearance.

It is another object of the present invention to provide an insecticidal device which may be hung from a support member or made to stand on a horizontal surface.

It is a further object of the present invention to provide an insecticidal device which makes use of the non-volatile insecticide which is either a stomach poison or a contact poison in combination with an insect attractant to lure the insects into contact with the insecticide.

It is still a further object of the present invention to provide a supporting substrate and support means for the substrate for holding a non-volatile insecticide composition.

Other and further objects will be apparent to those skilled in the art from reading the following description in conjunction with the drawings in which:

FIG. 1 is a perspective view of the assembled insecticidal device of the present invention;

FIG. 2 is a perspective view of the substrate utilized in the insecticidal device;

FIG. 3 is a front elevational view of the insecticidal device of the present invention;

FIG. 4 is a side elevational view of the insecticidal device of the present invention;

FIG. 5 is a plan view of the cage of the present invention in the open position;

FIG. 6 is a side elevational view of the cage in the open position;

FIG. 7 is a shortened sectional view, taken generally along lines 7—7 of FIG. 3;

FIG. 8 is a detail of the hinge and base construction taken generally along lines 8—8 of FIG. 5;

FIG. 9 is a perspective view of the stand member;

FIG. 10 is a partial side elevational view of the insecticidal device showing the stand member rotated for use; and FIG. 11 is a side elevational view showing the cage being rotated into position to enclose the substrate.

The objects of the present invention may be achieved in the preferred embodiment of the invention in which a coated substrate is set in a cage which may be of plastic such as polyvinylchloride or polyethylene to form an insecticidal device. The cage is designed to leave the greater part of the surface of the substrate exposed so that the insects can land on the surface. At the same time the cage allows the insecticidal device to be handled without touching the surface of the substrate. For this purpose the cage advantageously runs around the four narrow sides of the substrate. The circumscribing cage, which preferably has a generally U-shaped cross section to provide easy insertion and removal of substrate can if desired have flanges which extend over the outer portions of the wide surfaces of the substrate. The assembled insecticidal device is a generally thin, regular rectangle which may be economically packaged and requires a minimum of shelf space when displayed for sale.

Typically the substrate 12 is a rectangular foamed plastic about 9 centimeters wide, 30 centimeters high and 1 centimeter thick. It is made of polyurethane foam and is seated in a molded polypropylene cage. The cage is made up of two halves, which can be snapped together in the manner of a book cover which is held together by a spine. The two halves being held together by means of studs on the two free corners and in the middle of two long narrow sides. The cage is provided on one narrow side with a ring for use in hanging.

The cage is preferably constructed in the manner of a box which has a hinge at one narrow side with both of the large surfaces of the box less substantially open. Preferably a stand member is mounted rotatably on one narrow side of the cage in such a manner that it can be swiveled into position which it forms, together with the narrow side on which it sits the stable foot or support for supporting the insecticidal device in the upright position. For this purpose strip projections are advantageously provided at the two ends of the narrow side which carry the flange. These projections extend below the narrow sides by an amount which is equal to the thickness of the stand member.

The stand member is preferably rotatable at its center upon an axis which is perpendicular to the narrow side of the base which the stand member is attached. For this purpose the stand member advantageously comprises a stud which projects into an orifice in the corresponding narrow surface of the cage and is seated there by friction. The stand member is held by friction in any desired rotational position, yet can be displaced therefrom by the exertion of a correspondingly small force.

As may be seen in FIGS. 1, 3 and 4 the insecticidal device 10 of the present invention is comprised of a chemically inert substrate 12 contained in and supported by a cage, or support member 14. The cage 14 has at its upper end at least one tab 16 having defined in it an orifice 18 which is adapted to receive a suspension member 20, such as a string, which may be hung from a fixed member 22 which may be a ceiling, overhead fixture, or the like. The insecticidal device 10 at its bottom has a stand member 24 which is flush with the cage 14 when the device is used suspended from the tab 16. However, if desired, the stand member may be rotated to a position 26 to permit the device to stand up-right on a flat surface and so be supported at the bottom on any horizontal surface.

In FIG. 2 is shown the substrate 12 which in a preferred embodiment shown is of substantially rectilinear configuration having a broad and tall front surface 28 and back surface 30 and tall, narrow side surfaces 32, 34. The top surface 36 and bottom surface 38 are planar members conforming to the width and thickness of the substrate.

The substrate has a surface coating which is made up of an insect attractant and an insecticide which may be either a contact insecticide or a stomach poison. Preferably the substrate material is a closed pore, foamed plastic, such as polyurethane. The advantage of such material is that it provides a relatively large surface area to support the active composition but does not permit the composition to penetrate into the interior of the substrate where it would be unreachable by insects.

Suitable contact insecticides or stomach poisons include hexchlorocyclohexane and 0-dimethyl-0-2, 5-dichloro-4-bromophenyl thionophosphate. Mixtures may also be used as desired. The contact insecticide or stomach poison can advantageously be applied mechanically. The insect attractants which may be used are any of the well known pheromones or other commercial attractants.

As is shown in FIGS. 5 and 6 the cage 14 is made up of a base member 40 and first and second rectangular planar members 42, 44 which are connected to the base 40 by hinges 46 and 48, respectively. In order to make the planar members substantially open, large openings 50, 52, 54 and 56 are provided in the planar members 42, 44. In the preferred embodiment shown the openings are selected so as to define an intermediate support members 58, 60 between each of the two relatively large openings, as is shown. Stiffener walls 62, 64, 66 and 68 are provided to impart rigidity to the planar members 42, 44. End walls 70, 72 are defined at the ends opposite the base 40 of the first and second planar members 42 and 44, respectively. The height of the end walls 70, 72 is equal to half the width of the base 40 so that when the planar members 42, 44 are rotated together the end walls 70, 72 meet providing uniform depth within the closed cage.

In order to join the first and second planar members together and to support them in spaced relation to each other, side wall members 74, 76, 78, 80, 82, 84, 86, 88, 90, 92, 94 and 96 are provided. The height of the side wall members is equal to one half the width of the base 40. The side wall members 74, 76, 78, 80, 82, 84 of the first planar member 42 are each provided with studs 98, 100, 102, 104, 106 and 108 which are adapted to frictionally engage cooperating cavities 108, 110, 112, 114, 116 and 118 which are defined in the second planar member 44. The engagement of the studs in the cavities holds the first and second planar members in tight frictional engagement. As may be seen in FIG. 11 the insecticide device may be assembled by laying the coated substrate 12 into one of the planar members 44 and rotating the other planar member 42 around the hinges 46, 48 so that the pins engage the cavities.

If desired the studs and cavities may be provided with cooperating annular ridges and grooves, not shown, to increase the tightness of their connection.

In FIG. 9 is shown the stand member 24 which is comprised of a planar member 120 having rounded end portions 122, 124 and a centrally located shaft 126 which is adapted to engage an orifice 128 in the base 40. The shaft is retained in the base by a flange 130 as may best be seen in FIG. 10. The shaft 126 and the flange 130 are made of yieldable material so as to pass through the orifice 128 yet to permit the flange to expand on the opposite side and to resist being withdrawn. To this end the flange is tapered to permit easy insertion.

As may be best seen in FIG. 3 the length of the stand member 24 is less than the length of the base so that it does not extend beyond the base. As may be seen in FIG. 3 the base is provided with short projections or feet 132, 134 so that when the stand member 24 is rotated at right angles to the base as shown in FIG. 10 the projections provide two more points of support equal in depth to the thickness of the stand member and so provide an even surface. The stand member is provided with ridges 136, 138 spaced apart a distance equal to the width of the base so that after the stand member 24 has been rotated it may be pushed toward the base 40 and the ridges will prevent rotation of the base. The length of the shaft 126 between the planar member 120 and the flange 130 is made sufficient to permit such reciprocatory movement.

As is shown in FIGS. 3 and 5, if desired, large panel areas 140, 142 may be provided on the planar members 42, 44 in order to provide surfaces for the location of indicia or the application of an identifying label.

I claim:

1. A support device for a volatile insect attractant and a non-volatile insecticide comprising:
   A. A chemically inert substrate;
      1. Having an expanded surface area, and
      2. Having a substantially rectilinear configuration having a long dimension, a short dimension and a relatively thin depth compared to said long dimension;
   B. One-piece means to support said substrate comprising:
      1. A base;
      2. First and second rectangular planar members each further comprising:
         A. At least one relatively large opening defined in said planar member;
         B. A stiffener strip formed along each long edge of said members and defining an angle with said planar member and rigidifying said planar member, the width of each of said stiffener strips being less than half the width of said base, whereby openings are formed along the edges of said support means; and
         C. An end wall defined at the short side of said member opposite said base, the width of said end wall being half the width of said base;
      3. First and second hinge members respectively connecting said first and second planar members to said base; and
      4. Means mounted on each stiffener strip to join said first and second planar members in abutting relation after rotation toward each other about said hinges whereby said substrate is supportably enclosed between said first and second planar members.

2. A support device as defined in claim 1 wherein said joining means comprises:
   A. At least two wall members defined on each of said long edges, the height of each of said wall members being half the width of said base;
   B. A stud defined on each of said wall members of said first planar member, and
   C. A cavity defined in each of said wall members of said second planar member, said studs and cavities being adapted to frictionally engage each other and hold said first and second planar members in tight engagement.

3. A support device as defined in claim 1 further comprising:
   A. A tab defined on at least one of said end walls extending away from said base, and
   B. An orifice defined in said tab, defining a member adapted to suspend said device from an overhead support.

4. A device as defined in claim 1 further comprising:
   A. An orifice defined in said base;
   B. A thin elongated stand member shorter than the length of said base;
   C. A shaft defined at the center of said stand member and adapted to reciprocably engage said base orifice in a friction fit, whereby said stand member may be aligned with said base in one configuration or rotated to right angles to said base in another configuration thereby forming a stand at the bottom of said support device adapted to support said device on a horizontal surface.

5. A support device as defined in claim 4 further comprising:
   A. First and second ridges at opposite ends of said base equal in height to the thickness of said elongated stand member to support the ends of said base and function to level said support device when said stand member is rotated at an angle to said base and placed on a horizontal surface.

6. A support device as defined in claim 1 in which said substrate is comprised of closed cell expanded polyurethane.

* * * * *